United States Patent
Harris et al.

(10) Patent No.: US 12,543,242 B2
(45) Date of Patent: Feb. 3, 2026

(54) USE OF A COMMON UE INDICATOR CHANNEL FOR BS DTX ENERGY SAVING

(71) Applicant: NOKIA TECHNOLOGIES OY, Espoo (FI)

(72) Inventors: John Harris, Whitefish Bay, WI (US); Mads Lauridsen, Gistrup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/927,227

(22) Filed: Oct. 25, 2024

(65) Prior Publication Data

US 2025/0056662 A1    Feb. 13, 2025

Related U.S. Application Data

(63) Continuation of application No. PCT/EP2023/081259, filed on Nov. 9, 2023.

(60) Provisional application No. 63/446,167, filed on Feb. 16, 2023.

(51) Int. Cl.
| | |
|---|---|
| *H04W 76/28* | (2018.01) |
| *H04W 52/14* | (2009.01) |
| *H04W 72/1268* | (2023.01) |
| *H04W 74/0833* | (2024.01) |

(52) U.S. Cl.
CPC ......... *H04W 76/28* (2018.02); *H04W 52/146* (2013.01); *H04W 72/1268* (2013.01); *H04W 74/0833* (2013.01)

(58) Field of Classification Search
CPC ............. H04W 74/0833; H04W 76/28; H04W 72/0446; H04W 74/08; H04W 74/00
See application file for complete search history.

(56) References Cited

U.S. PATENT DOCUMENTS

| | | | | |
|---|---|---|---|---|
| 2004/0114574 A1* | 6/2004 | Zeira | ...................... | H04W 76/38 370/352 |
| 2015/0282214 A1* | 10/2015 | Lee | ................... | H04W 74/0833 370/329 |
| 2023/0354188 A1* | 11/2023 | Akl | ....................... | H04W 76/28 |

OTHER PUBLICATIONS

International Search Report and Written Opinion dated Mar. 11, 2024 corresponding to International Patent Application No. PCT/EP2023/081259.

Juha Korhonen et al., InterDigital, "Report of [301][NES] Summary of DTX/DRX—8.3.2," R2-2213071, 3GPP RAN WG2 Meeting #120, Toulouse, France, Nov. 14-19, 2022, Nov. 14, 2022, XP052228426.

(Continued)

*Primary Examiner* — Tu X Nguyen
(74) *Attorney, Agent, or Firm* — SQUIRE PATTON BOGGS (US) LLP

(57) ABSTRACT

A UE receives configuration for a common uplink channel to be used by the user equipment to communicate with a BS concerning cell DTX operation by the BS. The UE determines that a cell DTX operation has already started or the BS has signaled that cell DTX operation will start. The UE transmits, over the common uplink channel, an indication of data transmission need concerning cell DTX operation. The BS sends the configuration and starts the cell DTX operation or signals that the same will start. The BS receives the indication of data transmission need concerning the cell DTX operation. The BS determines whether to stay in or abandon the cell DTX operation based at least partly on the received indication of data transmission need.

18 Claims, 5 Drawing Sheets

(56) References Cited

OTHER PUBLICATIONS

InterDigital, "Cell DTX/DRX," R2-2212324, 3GPP RAN WG2 Meeting #120, Toulouse, France, Nov. 14-19, 2022, Nov. 4, 2022, XP052216408.
NTT Docomo, Inc., "Assistance information for cell reselection," R2-2212796, 3GPP TSG-RAN WG2 #120, Toulouse, France, Nov. 14-18, 2022, Nov. 4, 2022, XP052216865.
NTT Docomo, Inc., "Assistance information for NW DTX/DRX," R2-2212792, 3GPP TSG-RAN WG2 #120, Toulouse, France, Nov. 14-18, 2022, Nov. 4, 2022, XP052216861.
3GPP TR 38.864 V18.0.0 (Dec. 2022), Technical Report, 3rd Generation Partnership Project; Technical Specification Group Radio Access Network; Study on network energy savings for NR (Release 18), Jan. 4, 2023, pp. 1-71, XP052234920.
3GPP TR 38.864 V0.2.0 (Oct. 2022), Technical Report, 3rd Generation Partnership Project; Technical Specification Group Radio Access Network; Study on network energy savings for NR (Release 18), Oct. 2022.
3GPP TS 38.211 V17.4.0 (Dec. 2022), Technical Specification, 3rd Generation Partnership Project; Technical Specification Group Radio Access Network; NR; Physical channels and modulation (Release 17), Dec. 2022.
3GPP TS 38.331 V17.3.0 (Dec. 2022), Technical Specification, 3rd Generation Partnership Project; Technical Specification Group Radio Access Network; NR; Radio Resource Control (RRC) protocol specification (Release 17), Dec. 2022.
Huawei, "New SI: Study on network energy savings for NR," RP-213554, 3GPP TSG RAN Meeting #94e, Electronic Meeting, Dec. 6-17, 2021.
Huawei, "New WID: Network energy savings for NR," RP-223540, 3GPP TSG RAN Meeting #98-e, Electronic Meeting, Dec. 12-16, 2022.
Qualcomm Incorporated, Email discussion summary for [98e-10-R18-Regional-Subsets-Bands], RP-223450, 3GPP TSG-RAN #98-e, Electronic Meeting, Dec. 12-16, 2022.

\* cited by examiner

USE OF A COMMON UE INDICATOR CHANNEL FOR BS DTX ENERGY SAVING

CROSS-REFERENCE TO RELATED APPLICATION

This application is a Continuation of International Patent Application No. PCT/EP2023/081259 filed on Nov. 9, 2023, which claims priority from U.S. Provisional Application No. 63/446,167, filed Feb. 16, 2023, each of which is incorporated herein by reference in its entirety.

TECHNICAL FIELD

Exemplary embodiments herein relate generally to wireless communications, and, more specifically, relates to how user equipment (UEs) may work with discontinuous transmission (DTX) for cells formed by base stations (BSs).

BACKGROUND

Discussions are ongoing on how to reduce power in wireless networks. In particular, a cell formed by a base station (BS) in a cellular network could be placed into a low power mode, where the cell ceases to transmit while in that mode. This is referred to as a cell discontinuous transmission (DTX) operation, since the cell is not scheduled to transmit at every opportunity it can transmit. Therefore, the transmissions are discontinuous.

There can be issues with this. One such issue occurs if the user equipment (UEs) that connect to the cell have data to transmit. Should the cell be in DTX while a UE has data to transmit, there will be a delay between when the UE gets the data (such as an email generated by the person using the UE), and when the data is actually transmitted by the UE to the BS via the cell. On the other hand, the BS can lower its power if it has longer DTX periods of operation.

BRIEF SUMMARY

This section is intended to include examples and is not intended to be limiting.

In an exemplary embodiment, a method is disclosed that includes receiving, by a user equipment in a wireless communication system, configuration for a common uplink channel to be used by the user equipment to communicate with a base station concerning cell discontinuous transmission operation by the base station. The method also includes determining, by the user equipment, that a cell discontinuous transmission operation has already started or the base station has signaled that cell discontinuous transmission operation will start. The method further includes transmitting, by the user equipment over the common uplink channel, an indication of data transmission need concerning cell discontinuous transmission operation.

An additional exemplary embodiment includes a computer program, comprising instructions for performing the method of the previous paragraph, when the computer program is run on an apparatus. The computer program according to this paragraph, wherein the computer program is a computer program product comprising a computer-readable medium bearing the instructions embodied therein for use with the apparatus. Another example is the computer program according to this paragraph, wherein the program is directly loadable into an internal memory of the apparatus.

An exemplary apparatus includes one or more processors and one or more memories storing instructions that, when executed by the one or more processors, cause the apparatus at least to perform receiving, by a user equipment in a wireless communication system, configuration for a common uplink channel to be used by the user equipment to communicate with a base station concerning cell discontinuous transmission operation by the base station; determining, by the user equipment, that a cell discontinuous transmission operation has already started or the base station has signaled that cell discontinuous transmission operation will start; and transmitting, by the user equipment over the common uplink channel, an indication of data transmission need concerning cell discontinuous transmission operation.

An exemplary computer program product includes a computer-readable storage medium bearing instructions that, when executed by an apparatus, cause the apparatus to perform at least the following: receiving, by a user equipment in a wireless communication system, configuration for a common uplink channel to be used by the user equipment to communicate with a base station concerning cell discontinuous transmission operation by the base station; determining, by the user equipment, that a cell discontinuous transmission operation has already started or the base station has signaled that cell discontinuous transmission operation will start; and transmitting, by the user equipment over the common uplink channel, an indication of data transmission need concerning cell discontinuous transmission operation.

In another exemplary embodiment, an apparatus comprises means for performing: receiving, by a user equipment in a wireless communication system, configuration for a common uplink channel to be used by the user equipment to communicate with a base station concerning cell discontinuous transmission operation by the base station; determining, by the user equipment, that a cell discontinuous transmission operation has already started or the base station has signaled that cell discontinuous transmission operation will start; and transmitting, by the user equipment over the common uplink channel, an indication of data transmission need concerning cell discontinuous transmission operation.

In an exemplary embodiment, a method is disclosed that includes sending, by a base station in a wireless communication system, configuration for a common uplink channel to be used by user equipment to communicate with a base station concerning cell discontinuous transmission operation by the base station. The method also includes starting, by the base station, cell discontinuous transmission operation or signaling by the base station to the user equipment that cell discontinuous transmission operation will start. The method further includes receiving, by the base station from the user equipment over the common uplink channel, an indication of data transmission need concerning cell discontinuous transmission operation. The method further includes determining whether to stay in or abandon the cell discontinuous transmission operation based at least partly on the received indication of data transmission need.

An additional exemplary embodiment includes a computer program, comprising instructions for performing the method of the previous paragraph, when the computer program is run on an apparatus. The computer program according to this paragraph, wherein the computer program is a computer program product comprising a computer-readable medium bearing the instructions embodied therein for use with the apparatus. Another example is the computer program according to this paragraph, wherein the program is directly loadable into an internal memory of the apparatus.

An exemplary apparatus includes one or more processors and one or more memories storing instructions that, when executed by the one or more processors, cause the apparatus at least to perform: sending, by a base station in a wireless communication system, configuration for a common uplink channel to be used by user equipment to communicate with a base station concerning cell discontinuous transmission operation by the base station; starting, by the base station, cell discontinuous transmission operation or signaling by the base station to the user equipment that cell discontinuous transmission operation will start; receiving, by the base station from the user equipment over the common uplink channel, an indication of data transmission need concerning cell discontinuous transmission operation; and determining whether to stay in or abandon the cell discontinuous transmission operation based at least partly on the received indication of data transmission need.

An exemplary computer program product includes a computer-readable storage medium bearing instructions that, when executed by an apparatus, cause the apparatus to perform at least the following: sending, by a base station in a wireless communication system, configuration for a common uplink channel to be used by user equipment to communicate with a base station concerning cell discontinuous transmission operation by the base station; starting, by the base station, cell discontinuous transmission operation or signaling by the base station to the user equipment that cell discontinuous transmission operation will start; receiving, by the base station from the user equipment over the common uplink channel, an indication of data transmission need concerning cell discontinuous transmission operation; and determining whether to stay in or abandon the cell discontinuous transmission operation based at least partly on the received indication of data transmission need.

In another exemplary embodiment, an apparatus comprises means for performing: sending, by a base station in a wireless communication system, configuration for a common uplink channel to be used by user equipment to communicate with a base station concerning cell discontinuous transmission operation by the base station; starting, by the base station, cell discontinuous transmission operation or signaling by the base station to the user equipment that cell discontinuous transmission operation will start; receiving, by the base station from the user equipment over the common uplink channel, an indication of data transmission need concerning cell discontinuous transmission operation; and determining whether to stay in or abandon the cell discontinuous transmission operation based at least partly on the received indication of data transmission need.

DETAILED DESCRIPTION OF THE DRAWINGS

Figure 1A:
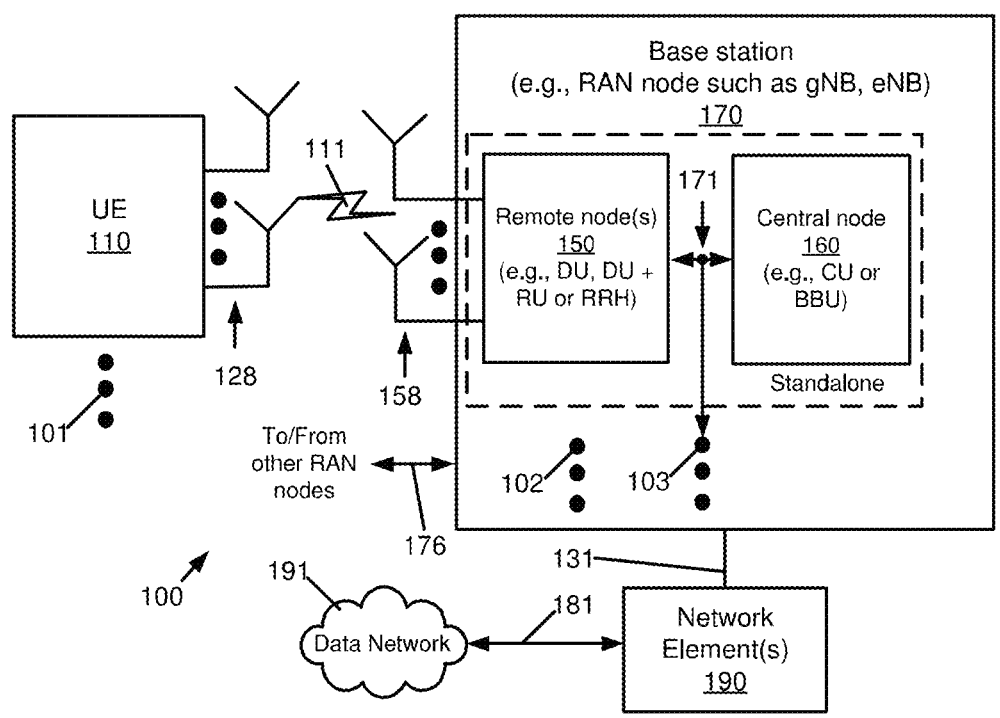
FIG. 1A is a block diagram of one possible and non-limiting exemplary system in which the exemplary embodiments may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

When more than one drawing reference numeral, word, or acronym is used within this description with "/", and in general as used within this description, the "/" may be interpreted as "or", "and", or "both".

As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Any flow diagram (such as FIG. 3 or FIG. 4) or signaling diagram (such as FIG. 2) herein is considered to be a logic flow diagram, and illustrates the operation of an exemplary method, results of execution of computer program instructions embodied on a computer readable memory, functions performed by logic implemented in hardware, and/or interconnected means for performing functions in accordance with an exemplary embodiment. Block diagrams also illustrate the operation of an exemplary method, results of execution of computer program instructions embodied on a computer readable memory, functions performed by logic implemented in hardware, and/or interconnected means for performing functions in accordance with an exemplary embodiment.

The exemplary embodiments herein describe techniques for use of a common UE indicator channel for cell DTX energy saving. Additional description of these techniques is presented after a system into which the exemplary embodiments may be used is described.

Turning to FIG. 1A, this figure shows a block diagram of one possible and non-limiting exemplary system in which the exemplary embodiments may be practiced. A number of nodes are shown: a user equipment (UE) 110; a base station 170; and network element(s) 190.

In FIG. 1A, a user equipment (UE) 110, as one of the nodes, is in wireless communication via wireless link 111 with a wireless network 100. A UE 110 is a wireless, typically mobile device that can access a wireless network. The UE 110 is illustrated with one or more antennas 128. The ellipses 101 indicate there could be multiple UEs 110.

The base station 170, as another of the nodes, provides access by wireless devices such as the UE 110 to the wireless network 100. The base station 170 is illustrated as having one or more antennas 158. There are many options for the base station 170. In general, the base station 170 is a RAN node, and in particular could be a gNB, which is the primary term used herein. That is, the base station 170 will be referred to as gNB 170. There are, however, many options including an eNB for the base station, or options other than cellular systems.

There are a number of configurations for the base station 170. One such is a "standalone" configuration, which includes all circuitry as part of a single unit, and accesses the antennas 158. More commonly today, circuitry is split into one or more remote nodes 150 (accessing antennas 158) and central nodes 160. For instance, for 5G (also referred to as NR), a gNB might include a distributed unit (DU), or DU and radio unit (RU) as the remote nodes(s), and a central unit (CU) as the central node 160. For LTE, the base station 170 might include an eNB having a remote radio head as remote node 150 and a base band unit (BBU) as a central node 160. The remote node(s) 150 are coupled to a central node 160 via one or more links 171. There could be multiple remote nodes 150 for a single central node 160, and this is indicated by ellipses 102, indicating multiple remote nodes, and ellipses 103, indicating additional links 171. The remote nodes 150 are remote in the sense they are contained in different physical enclosures from a physical enclosure containing a corresponding central node 160. The link(s) 171 may be implemented using fiber optics, wireless techniques, or any other technique for data communications.

Two or more base stations 170 communicate using, e.g., link(s) 176. The link(s) 176 may be wired or wireless or both and may implement, e.g., an Xn interface for 5G, an X2 interface for LTE, or other suitable interface for other standards.

The wireless network 100 may include a network element or elements 190, as a third illustrated node, that may include core network functionality, and which provide connectivity via a link or links 181 with a data network 191, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity) functionality and/or SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards.

In general, the various embodiments of the user equipment 110 can include, but are not limited to, cellular telephones (such as smart phones, mobile phones, cellular phones, voice over Internet Protocol (IP) (VOIP) phones, and/or wireless local loop phones), tablets, portable computers, vehicles or vehicle-mounted devices for, e.g., wireless V2X (vehicle-to-everything) communication, image capture devices such as digital cameras, gaming devices, music storage and playback appliances, Internet appliances (including Internet of Things, IoT, devices), IoT devices with sensors and/or actuators for, e.g., automation applications, as well as portable units or terminals that incorporate combinations of such functions, laptop-embedded equipment (LEE), laptop-mounted equipment (LME), Universal Serial Bus (USB) dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. That is, the UE 110 could be any end device that may be capable of wireless communication. By way of example rather than limitation, the UE may also be referred to as a communication device, terminal device (MT), a Subscriber Station (SS), a Portable Subscriber Station, a Mobile Station (MS), or an Access Terminal (AT).

Figure 1B:
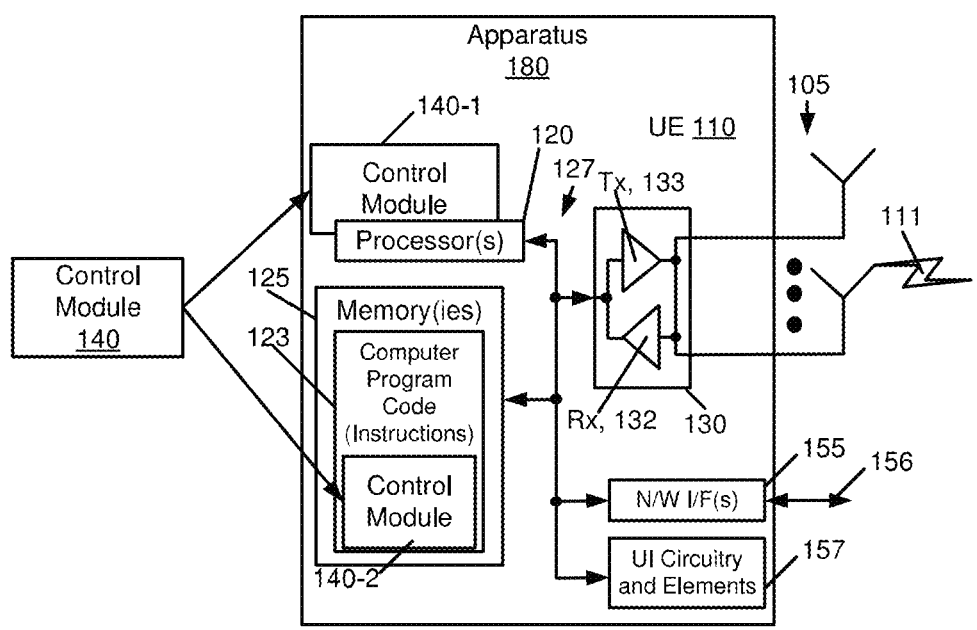
FIG. 1B is an example of a block diagram of an apparatus suitable for implementing any of the nodes in FIG. 1A.

Turning to FIG. 1B, this figure is an example of a block diagram of an apparatus 180 suitable for implementing any of the nodes in FIG. 1A. The apparatus 180 includes circuitry comprising one or more processors 120, one or more memories 125, one or more transceivers 130, one or more network (N/W) interface(s) (I/F(s)) 155 and user interface (UI) circuitry and elements 157, interconnected through one or more buses 127. Since this is an example covering all of the nodes in FIG. 1A, some of the nodes may not have all of the circuitry. For example, a base station 170 might not have UI circuitry and elements 157. All of the nodes may have additional circuitry, not described here. FIG. 1B is presented merely as an example.

Each of the one or more transceivers 130 includes a receiver, Rx, 132 and a transmitter, Tx, 133. The one or more buses 127 may be address, data, and/or control buses, and may include any interconnection mechanism, such as a series of lines on a motherboard or integrated circuit, fiber optics or other optical communication equipment, and the like. The one or more transceivers 130 are connected to one or more antennas 105, which could be one of the antennas 128 (from UE 110) or antennas 158 (from base station 170), and may communicate using wireless link 111.

The one or more memories 125 include computer program code 123. The apparatus 180 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code (having corresponding instructions) 123 and is executed by the one or more processors 120. For instance, the one or more memories 125 store instructions that, when executed by the one or more processors 120, cause the apparatus 180 to perform one or more of the operations as described herein. Furthermore, the one or more processors 120, one or more memories 125, and example algorithms (e.g., as flowcharts and/or signaling diagrams), encoded as instructions, programs, or code, are means for causing performance of the operations described herein.

The network interface(s) (N/W I/F(s)) 155 are wired interfaces communicating using link(s) 156, which could be fiber optic or other wired interfaces. The link(s) 156 could be the link(s) 131 and/or 176 from FIG. 1A. The link(s) 131 and/or 176 from FIG. 1A could also be implements using transceiver(s) 130 and corresponding wireless link(s) 111. The apparatus could include only wireless transceiver(s) 130, only N/W I/Fs 155, or both wireless transceiver(s) 130 and N/W I/Fs 155.

The apparatus 180 may or may not include UI circuitry and elements 157. These could include a display such as a touchscreen, speakers, or interface elements such as for headsets. For instance, a UE 110 of a smartphone would typically include at least a touchscreen and speakers. The UI circuitry and elements 157 may also include circuitry to communicate with external UI elements (not shown) such as displays, keyboards, mice, headsets, and the like.

The computer readable memories 125 may be of any type suitable to the local technical environment and may be implemented using any suitable data storage technology, such as semiconductor-based memory devices, flash memory, firmware, magnetic memory devices and systems, optical memory devices and systems, fixed memory and removable memory. The computer readable memories 125 may be means for performing storage functions. The processors 120 may be of any type suitable to the local technical environment, and may include one or more of general-purpose computers, special purpose computers, microprocessors, digital signal processors (DSPs) and processors based on a multi-core processor architecture, as non-limiting examples. The processors 120 may be means for performing functions, such as controlling the apparatus 180, and other functions as described herein.

Having thus introduced one suitable but non-limiting technical context for the practice of the exemplary embodiments, the exemplary embodiments will now be described with greater specificity.

A study on network energy savings was carried out in 3GPP Rel. 18 (RP-213554, Qualcomm Incorporated, "Email discussion summary for [98e-10-R18-Regional-Subsets-Bands]", 3GPP TSG-RAN #98-c RP-223450, Dec. 12-16, 2022) and documented in 3GPP TR 38.864 (e.g., 3GPP TR 38.864 V0.2.0 (2022-10)). The focus is on the radio access network (NW) which consumes the largest part of the total energy consumption in the network, and aims at identifying adaptation techniques of transmissions and/or receptions in time, frequency, spatial, and power domains, with potential support/feedback from the UE, potential UE assistance information, and information exchange/coordination over network interfaces.

Based on the outcome of the study item a 3GPP NR release 18 work item on network energy saving (RP-223540) was defined. The work item includes the following objective (shown between opening and closing quotation marks):

"Specify enhancement on cell DTX/DRX mechanism including the alignment of cell DTX/DRX and UE DRX in RRC_CONNECTED mode, and inter-node information exchange on cell DTX/DRX [RAN2, RAN1, RAN3]

Note: No change for SSB transmission due to cell DTX/DRX.

Note: The impact to IDLE/INACTIVE UEs due to the above enhancement should be avoided."

It is noted that the cell DRX and cell DTX are different behaviors. That is, in cell DRX, the cell is not receiving, while the cell could in principle transmit and vice versa for cell DTX. However, the challenge is that communication flows are not one-way only. For example, if the UE has transmitted something, the network needs to provide ACK/NACK to indicate whether the data was received successfully. As another example, the UE may send a request in uplink to an application/service, which will cause a downlink response and thus both link directions will be needed. Therefore, if the cell is in DTX, typically the UE will not be able to transmit data.

The cell discontinuous transmission (DTX) operation is a promising solution to save network energy by switching on/off radio units (e.g., power amplifier) when there is no transmission to be made. Along with hardware and software capability improvements, the shutdown of the PA on an OFDM symbol basis becomes possible for extended periods of time. It is noted that cell DTX may be referred to as cell DTX or cell DTX operation, and the DTX operation typically occurs within periods (of operation).

A cell DTX indication has been introduced for base station energy saving with a method to use downlink cell DTX operation while avoiding/minimizing the impact to UE and gNB with the following: Efficient cell DTX indication to the UE, e.g., in terms of patterns or periods; and/or UE behaviors/operations when indicated cell DTX periods collide with pre-configured transmissions and other UE actions such as measurements.

Concerning improving (e.g., maximizing) the energy savings from cell DTX, when the cell load is low, the cell may want to apply DTX as much as possible whenever there is little or no user plane data to be transmitted in a (mini-) slot or a longer period of time. The period is upper bounded by the SSB transmission periodicity, which the WID clearly states cannot be changed. A common SSB transmission periodicity is 20 ms, while the upper limit is 160 ms.

However, if the BS lacks an up-to-date view of the demand (for cell loading/transmissions), then cell DTX might not enable maximized BS energy savings or delay of data could be caused. For example, this could waste energy when the load does not merit the cell exiting of cell DTX (thereby deactivating cell DTX) or the cell is not being placed into cell DTX when it could be. Another example is adding more delay in UE transmissions than appropriate with unnecessary cell DTX operation, as if cell DTX is activated and a UE has data to send, there will be a delay.

Furthermore, there is also the scope to minimize the amount of gNB energy consumed in supporting responses to isolated UE traffic demand. For example, a cell should not wake up/stay awake to just support a single UE, which does not have delay critical data. Thus, clustering UE connections can produce further energy efficiency of the gNB.

That further energy efficiency is particularly important when the gNB is in emergency/battery backup (referred to here as "ultra" energy savings), as in that case there is the need for cell DTX and to avoid existing supporting connectivity until a sufficient UE demand exists justifying the gNB exiting cell DTX/ES, e.g., not exiting (ultra) energy savings/cell DTX when there is only a single UE seeking connectivity. In ultra energy savings, the system coverage/QoS may be reduced in order to further "stretch" the energy available.

Hence, a mechanism to enable UEs to indicate over a common uplink channel when/where the gNB entering/exiting cell DTX/CSM is (e.g., most) beneficial should be defined. The following are examples of possible parts of the mechanism and additional techniques.

The gNB 170 in (ultra) energy savings (e.g., using the cell DTX indication for cell DTX previously described), configures a common uplink channel to occur. The common uplink channel may be based on a principle similar to the random-access preambles, where each UE does not have scheduled, dedicated resources. The common uplink channel is used so all the UEs in the cell can choose to transmit on this channel without requesting a specific resource (by contrast to what is usually the cause for the physical uplink shared channel). Instead, the common uplink channel is operated like the random-access channel, which is "contention-based" in the sense that UEs can make an attempt and transmit on the channel with the risk of collision/contention with transmissions from other UEs. The contention-based common uplink channel is not an issue herein, because the cell just needs to be aware of the overall load on the channel and not the individual UE transmissions, because the overall load (e.g., via use of the "urgent" indications via specific resources) will guide the cell to decide whether to use cell DTX or not.

The common uplink channel can be configured to occur with a specific offset prior to the scheduled cell DTX activation/deactivation signaling and also in specific resources during the cell DTX period. The network configures the common uplink channel, but the configuration itself is not sent on this channel (because this channel is uplink, i.e., from UE to BS). The configuration can be broadcasted (e.g., via System Information Broadcast to all UEs) or configured via UE-specific signaling.

Meanwhile, the UEs 110 can utilize the common uplink channel to provide feedback on whether the cell should abort/not start the cell DTX/energy saving, e.g., a transmission in the channel is indicating to the network to abort/not start cell DTX/energy saving.

The gNB 170 may accumulate the estimated UE transmissions on the common uplink channel over some consecutive/series of common uplink channel transmission opportunities.

The information received on the common uplink channel enables the gNB to decide if the gNB will/will not be in cell DTX/ES/CSM (cell sleep mode) in the next interval. One example for this is the following. The network decision is left for implementation, but can be based on the estimate of the accumulated number of UEs transmitting in the channel and the receive power levels of those transmissions (on the different common uplink channel RACH codes/preambles/common uplink channel occasions). For instance, if the gNB is lower (e.g., than a threshold) on power, then the gNB may wait more and stay in cell DTX/ES/CSM until the estimate of the accumulated number of UEs is an even larger value (e.g., some threshold value). As another example, if gNB is aware of more DL data that that is pending for that cell, then the gNB may wait less and only stay in cell DTX/ES/CSM until the estimate of the accumulated number of UEs is a smaller value.

Another example is the following. The location of the common uplink channel may be aligned across cells to enable use cases where there are multiple cells in CSM/cell DTX with potentially overlapping coverage. That is, a UE at a cell border between two cells (each with coverage at the cell border and both with cell DTX), where both cells can receive from that UE at the same time, can potentially stop cell DTX in at least one (and possibly both) of the cells using the techniques herein.

One option that may be implemented is a policy for a UE to avoid repeated transmission on the common uplink channel. Consider the following.

1) Pre-configured rules may be used to enable the UE to avoid the need for repeated transmissions on the common uplink channel opportunities while waiting for the gNB to exit cell DTX.
2) If the UE transmits an indication of demand for connectivity in the common uplink channel (at time i), but the network continues to use cell DTX, then the UE skips reporting that information again on some subset of the next subsequent (such as time i+x . . . ) common uplink channel's reporting opportunities. That is, if the UE has data or traffic is anticipated, the idea is to avoid the UE's retransmitting its request on every occasion while it waits for the cell to exit DTX. The gNB, however, will remember its requests received within that prohibit timer window. The network may configure the value x to prevent UEs from repeated transmissions.
3) The UE may increase the transmit power of the next common uplink channel transmission to inform the network about the urgency of the pending transmission. The increased received power can indicate either more UEs transmitting or a UE which has queued longer—both convey higher urgency to stop cell DTX.

Concerning common uplink channel configuration, consider the following.

1) Different RACH codes/preambles/common uplink channel occasions can be used to indicate the urgency of the UE's pending data. For instance, preamble A/resource A indicates no urgency, while preamble B/resource B indicates the UE has urgent data/has queued for a long time.
2) Transmit power ramping can also be used to indicate urgency, e.g., UE can increase the transmit by 3 dB in the next transmission if the gNB did not stop cell DTX after the first transmission.
3) The preamble selection can be an input to the UE's subsequent policy for determining when/where/how to send an additional/repeated indication, e.g., if that will be sooner (e.g., more urgent) or later (e.g., less urgent), using more or less transmit power accordingly (e.g., more transmit power=more urgent, less transmit power=less urgent). This could additionally or alternatively also select different (combination of) different random access channel codes, different preambles, and/or different common uplink channel occasions.
4) Different RACH codes/preambles/common uplink channel occasions can be used to indicate the UE's power state, e.g., a UE with a low battery level (e.g., lower than a threshold) selects a preamble indicating the UE will wait longer before it will send an additional/repeated indication.

As one example, the gNB may provide an "ACK" indication to the UE's transmission on the common uplink channel. This may be performed as follows.

1) Note: (In this case the) network is not fully aware which UE transmitted the ACK indication, because the UE does not use a UE-specific ID/RNTI on the common uplink channel, the network cannot provide UE specific feedback.
2) An RAR-type of transmission can be scheduled on PDSCH (or given in SIB).
3) The transmission can be scheduled via PDCCH using a common RNTI.
4) The transmission can indicate which preamble(s)/resource(s) the cell detected were/was used for the common uplink channel (and possibly with some information on the power/multipath delay detected).
5) This Step 4 provides probabilistic feedback to the UE on whether its indication was heard (probabilistic as collisions are not resolved). That is, if the cell indicates it detected a transmission using preamble x/resource y, the cell can indicate this in the ACK/feedback, and then the UE which transmitted using that preamble/that resource knows the cell received an indication. The UE will, however, not know if it was the indication from the UE, because other UE(s) may also have transmitted using preamble x/resource y—that is the reason for the "probabilistic" note. Collisions could cause the UE to receive an ACK for a different UE. The UE can only know the cell received something in the given resource/preamble, but not whether it was the transmission from the UE itself. This probabilistic feedback can nonetheless be an input to the UE's subsequent policy for determining when/where/how to send an additional/repeated indication, e.g., if that will be sooner or later, using more or less transmit power.

Figure 2:
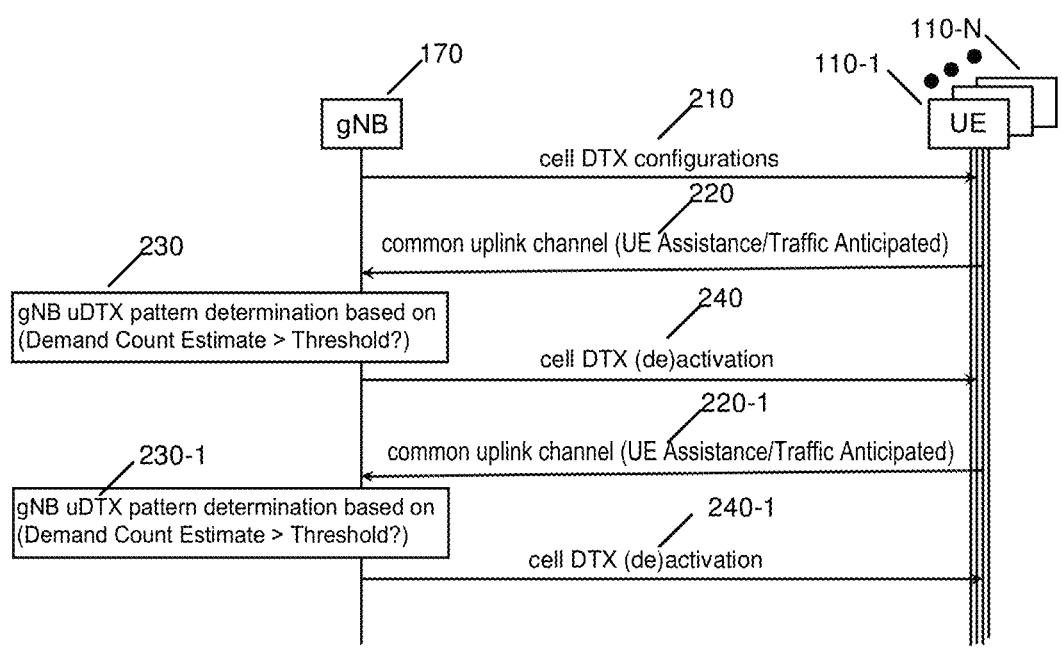
FIG. 2 is an example of a signaling diagram in accordance with an embodiment.

Referring to FIG. 2, this figure is an example of a signaling diagram in accordance with an embodiment. The UE 110 performs the operations and functions in the signaling under control of a corresponding control module 140, and the gNB 170 performs the operations and functions in the signaling and blocks under control of a corresponding control module 140. In signaling 210, the gNB 170 sends cell DTX configurations to the UEs (Ues) 110-1 to 110-N. The UEs 110 respond on signaling 220, on a common uplink channel. These responses include UE assistance (i.e., the signaling on the common uplink channel) and/or indication of traffic that is anticipated. In block 230, the gNB 170 performs a cell DTX pattern determination based on whether Demand Count Estimate is greater than (>) a threshold. Depending on the outcome, the gNB 170 sends (signaling 240) cell DTX (de) activation(s) to the UEs 110. In other words, if the Demand Count Estimate is greater than the threshold, then cell DTX would be deactivated. Meanwhile, if the Demand Count Estimate is less than (e.g., or equal to) the threshold, then cell DTX could be activated or stay activated. The signaling 220 (as 220-1), block 230 (as 230-1), and signaling 240 (as 240-1) are repeated.

The indication on the common uplink channel (see signaling 220 and 250) can be based on the existing 5G NR design for the random-access channel, i.e., the preamble transmission. The RA preamble transmission is specified in 3GPP TS 38.211 and 3GPP TS 38.331, where the latter defines how the relevant parameters are configured to the UE. The main configuration is given in the information element RACH-ConfigCommon with further details in RACH-ConfigGeneric.

Example parameters to reuse for the common uplink channel include the following:
1) totalNumberOfRA-Preambles, which defines the total number of preambles.
2) prach-ConfigurationIndex, which defines the index in the RA configuration table in 3GPP TS 38.211. The table defines the preamble format, subframe number and starting symbol and the like, which can be reused for the common uplink channel.
3) msg1-FDM, which is the number of preamble transmissions frequency-division multiplexed per time instance.
4) msg1-FrequencyStart, which is an offset for the preamble transmission relative to PRB 0.
5) powerRampingStep, which defines the transmit power ramping for the preamble transmission. This can also be used to indicate the urgency of the traffic.

The parameters may be divided into at least two sets of configurations, such that set 1 corresponds to traffic with low urgency, while use of set 2 will indicate a higher level of urgency to the gNB. Whether to use set 1 or set 2 can be defined by the determine QoS/QoE/any other definition of the traffic, or alternatively the UE may also be allowed to switch from set 1 to set 2 if no response is received from the network after (a network configurable) threshold y transmissions on set 1.

Furthermore, a new information element for the common uplink channel should include (or alternatively the information can be specified elsewhere outside that RRC IE) a prohibit timer for transmission. The value will define the minimum periodicity for transmissions on the channel, i.e., when UE has transmitted in occasion i, the UE is not allowed to transmit again until occasion i+x. This prohibit timer may be reset based on beam and/or cell reselection.

Finally, the specification or network configuration should define the RNTI, which is used to schedule the common feedback via PDCCH, and potentially also the (time) offset between the common uplink channel transmit occasion and the PDCCH scheduling the common feedback.

Figure 3:
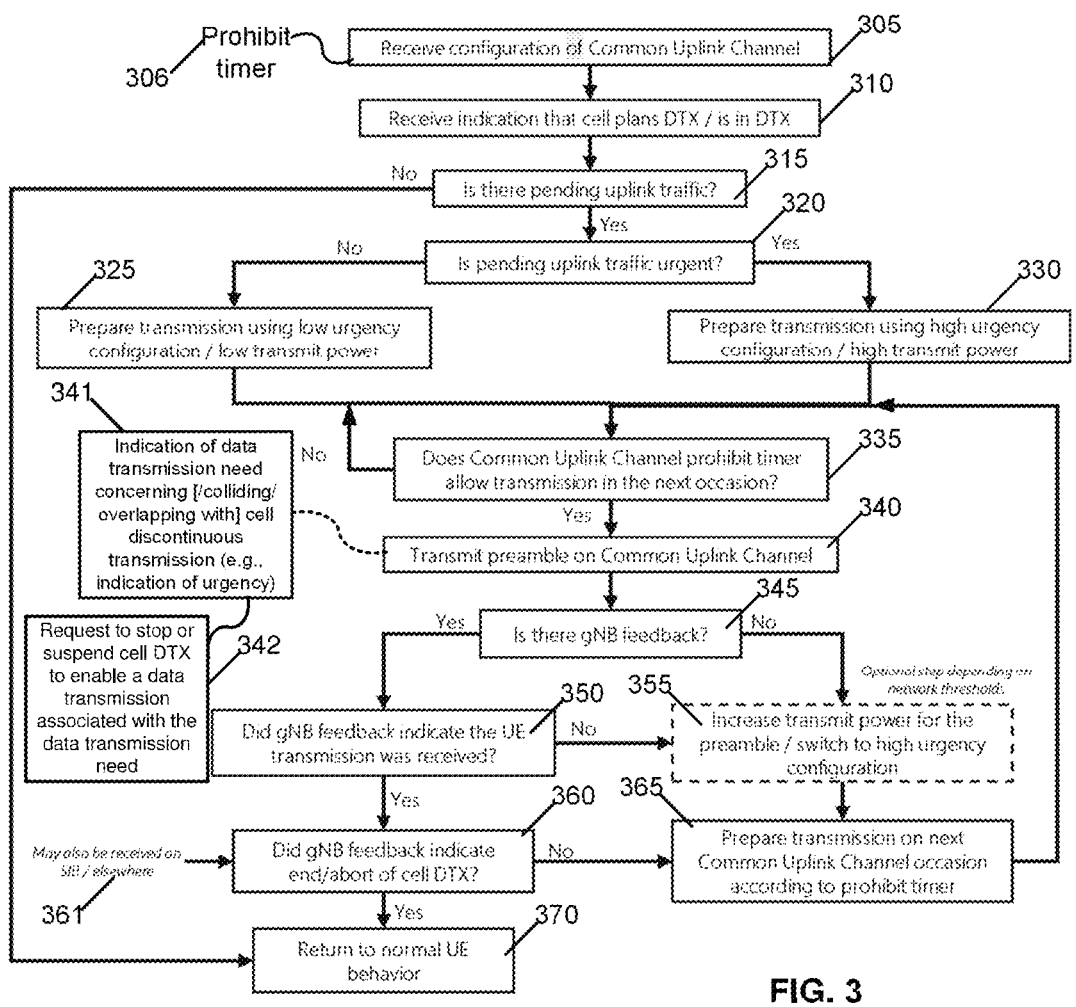
FIG. 3 is a flow diagram for a UE, illustrating selected aspects in accordance with an embodiment.

Turning to FIG. 3, this figure is a flow diagram for a UE 110, illustrating selected aspects in accordance with an embodiment. The UE performs the operations and functions in the blocks under control of a control module 140. In block 305, the UE receives configuration of the common uplink channel. The reception is on a channel that is not the common uplink channel. As indicated, this configuration can include a prohibit timer, previously described above and used later in FIG. 3. The UE 110 receives in block 310 an indication that the cell plans cell DTX or is in cell DTX. This indication could be one that indicates "cell DTX starts now" or "cell DTX starts at 2 PM" or any other indication as to the current or future status of cell DTX.

The UE 110 determines if there is pending uplink (and/or DL data that it is aware of) traffic in block 315. The DL data could be for the case where the UE application knows that DL data will be pushed to it soon, e.g., where this DL data may have some higher urgency and may not be preceded by UL data per se. If there is no pending uplink traffic (block 315=No), the flow proceeds to block 370. If there is pending uplink traffic (block 315=Yes), the flow proceeds to block 320. The UE determines if there is a pending traffic request in block 320.

If not (there is no pending traffic request, block 320=No), in block 325, the UE 110 prepares a transmission using a low urgency configuration and/or low transmit power. The flow proceeds to block 335. Regarding urgency and whether this is characterized as "low" or "high", this may depend on the latency requirement for the traffic. The level could be linked to quality-of-service requirements, but it is also possible to provide an example: a voice call would be in the urgent category, while a text message or an application update (most likely) would not be. The distinction between low and high urgency can be known and can be, e.g., based on one or more thresholds. For transmit power, an extreme would be to set high urgency=maximum transmit power (usually 23 dBm for handheld devices). Alternatively, for low urgency, the UE can transmit according to the uplink transmit power control (based on downlink RSRP measurements), while, for high urgency, the UE may add x dB to that estimate to increase the transmit power to a "high" transmit power. Other options are possible, but "low" and "high" power will be known.

If so (there is a pending traffic request, block 320=YES), in block 330, the UE 110 prepares a transmission using a high urgency configuration and/or high transmit power. The flow proceeds to block 335.

In block 335, the UE 110 determines whether the common uplink channel prohibit timer allows transmission in the next (transmission) occasion. If not (block 335=No), the flow proceeds again to block 335. If the transmission is allowed (block 335=Yes), the flow proceeds to block 340, where the UE 110 transmits a preamble on the common uplink channel. The transmission of the preamble may also include an indication of urgency (see block 341) if specific resources are configured for that. In more detail, the preamble can include any indication of data transmission need concerning cell discontinuous transmission. That data transmission need concerning cell discontinuous transmission operation refers to if a data transmission need can collide with or overlap with the cell DTX. In other words, the UE would like to transmit data in UL, but this collides with a current cell DTX operation (i.e., the UE has or anticipates it will have data during a cell DTX operation), or overlaps with a current DTX operation (e.g., the UE anticipates it will have data and the arrival time of the data overlaps with when the current DTX operation is or will be occurring). Block 342 is an example of block 341, where the indication of data transmission need concerning cell discontinuous transmission operation includes a request to stop or suspend cell DTX operation to enable the UE to perform a data transmission associated with the data transmission need.

In block 345, the UE determines if feedback from the gNB 170 has been received. One example allowing the feedback could be that the common uplink configuration defines that feedback is delivered y ms after the common uplink channel resource. That is, UEs can monitor for the feedback in a resource y ms after the transmission. The feedback may also be scheduled via PDCCH and transmitted on PDSCH (as usual). If there is gNB feedback (block 345=Yes), the UE then determines in block 350 whether the gNB feedback indicated the UE transmission (from block 340) was received. If so (block 350=Yes), the UE 110 determines whether the gNB's feedback indicates the end/abortion of cell DTX in block 360. That is, the feedback could indicate that the cell DTX of the cell is ending normally, or has been (e.g., abnormally) aborted early. This feedback could also be received on the SIB or elsewhere, see reference 361. If the feedback indicates an end/abortion of the cell DTX operation (block 360=Yes), the UE 110 returns to normal behavior in block 370.

In block 345, if there is no gNB feedback (block 345=No), the method proceeds to an optional block 355, which may be used depending on network thresholds. That is, the network could for example define a threshold which says "if UE has transmitted three times (i.e., the threshold), but not received network feedback, the UE is allowed to increase the transmit power/switch to urgent configuration". Other thresholds are possible. In block 355, the UE 110 increases transmit power for the preamble and/or switches to a high urgency configuration. It is noted that block 355 may also be reached if the gNB feedback does not indicate the UE transmission (from block 340) was received (block 350=No). Once block 355 has been performed, the UE in block 365 prepares transmission (of the preamble) on the next common uplink channel occasion according to the prohibit timer. Block 365 may also be reached from block 360, if the gNB feedback did not indicate an end/abortion of cell DTX operation (block 360=No). The flow proceeds from block 365 back to block 335.

Figure 4:
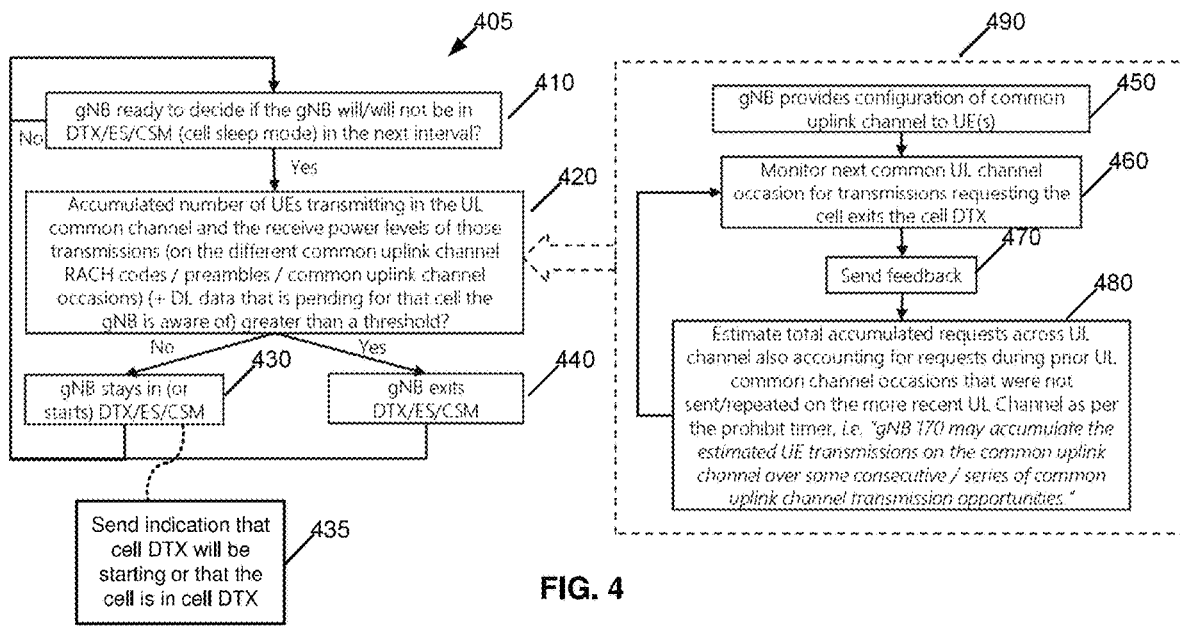
FIG. 4 is a flow diagram for a base station (e.g., gNB), illustrating selected aspects in accordance with an embodiment.

Turning to FIG. 4, this figure is a flow diagram for a base station (e.g., gNB), illustrating selected aspects in accordance with an embodiment. This example is divided into two parts: part 405 for a real-time cell DTX process; and part 490, which provides configuration, feedback, and analysis to enable 405. The blocks are performed by a base station such as a gNB, e.g., under control of a corresponding control module 140.

In block 410, the gNB determines whether it is ready to decide if the gNB will/will not be in DTX/ES/CSM (cell sleep mode) operation in the next interval. If not (block 410=No), the gNB 170 waits by performing block 410 again.

If so (block 410=Yes), the gNB in block 420 determines whether accumulated number of UEs transmitting in the UL common channel and the receive power levels of those transmissions (on the different common uplink channel RACH codes/preambles/common uplink channel occasions) (+DL data that that is pending for that cell the gNB is aware of) are greater than a threshold. This example has the threshold considering at least both the number of UEs and their corresponding power of their transmissions. Multiple thresholds could be used (e.g., one for number of UEs and one for corresponding power of transmissions), and the thresholds could be considered in multiple ways. For instance, if either the number of UEs is greater than its threshold or the corresponding power of transmissions is greater than its threshold, then the gNB would exit the cell DTX operation. Another example would require both thresholds to be met. As indicated by block 420, the gNB could also consider whether the DL data that is pending for that cell the gNB is aware of. This could use a separate threshold, or be built into a single threshold of block 420.

If the number and power levels are not greater than a threshold (block 420=No), the gNB stays in (or starts) cell DTX, which is shown as DTX/ES/CSM. Sec block 430. By contrast, if the number and power levels are greater than a threshold (block 420=No), the gNB exits cell DTX, which is shown as DTX/ES/CSM. See block 440.

In block 435, the gNB 170 can notify the UE(s) 110 of an impending cell DTX or a current cell DTX operation. Thus, the gNB sends indication that cell DTX will be starting or that the cell is in cell DTX. It is also possible the gNB could indicate the following in consecutive intervals: Cell DTX starts at time X (e.g., or in X minutes); Cell DTX has started; Cell DTX will continue for X minutes (e.g., or for the next N intervals, N≥1); Cell DTX has ended. Other options are possible.

For part 490, the gNB provides configuration of the common uplink channel to the UE(s) 170. See block 450. The gNB 170 monitors, in block 460, a next common UL channel occasion for transmissions (e.g., of preambles) requesting the cell exits the cell DTX. In block 470, the gNB 170 sends feedback to the UE(s) 170 to which the gNB believes preambles have been received.

In block 480, the gNB 170 estimates total accumulated requests across the common UL channel, also accounting for requests during prior UL common channel occasions that were not sent/repeated on the more recent UL channel as per the prohibit timer. A rule could be the following: "gNB 170 may accumulate the estimated UE transmissions on the common uplink channel over some consecutive/series of common uplink channel transmission opportunities." The flow proceeds back to block 460. The data estimated in block 480 can be used in block 420.

Note that block 460 can include determining received power levels. Block 460 may also include determinations of indication of urgency, if these are used.

Without in any way limiting the scope, interpretation, or application of the claims appearing below, a technical effect and advantage of one or more of the example embodiments disclosed herein is increasing the amount of time that the gNB can use cell DTX, especially to improve gNB in emergency mode or on battery backup, and Ultra ES. Another technical effect and advantage of one or more of the example embodiments disclosed herein is to decrease the amount of gNB energy consumed supporting responses to (relatively) isolated UE traffic demand, i.e., avoid early/frequent stopping of cell DTX. This can include minimizing/avoiding supporting connectivity until a sufficient amount of UE demand is present within that cell, so as to justify the gNB exiting ES. For example, seeking to enable a gNB which is running on battery backup and using cell DTX to avoid exiting energy saving state to respond when there is only a single UE seeking connectivity. Another technical effect and advantage of one or more of the example embodiments disclosed herein is use of random-access preamble type of transmission enables the gNB to receive feedback from multiple UEs without scheduling the individual UEs. Furthermore, the feedback channel enables UEs to determine whether to repeat their indication.

The following are additional examples:

Example 1. A method, comprising:
receiving, by a user equipment in a wireless communication system, configuration for a common uplink channel to be used by the user equipment to communicate with a base station concerning cell discontinuous transmission operation by the base station;
determining, by the user equipment, that a cell discontinuous transmission operation has already started or the base station has signaled that cell discontinuous transmission operation will start; and
transmitting, by the user equipment over the common uplink channel, an indication of data transmission need concerning cell discontinuous transmission operation.

Example 2. The method according to example 1, wherein the configuration for the common uplink channel comprises one or more of the following: one or more resource allocations for the common uplink channel, or one or more preambles to be used when transmitting on the common uplink channel.

Example 3. The method according to any one of examples 1 or 2, wherein the indication of data transmission need concerning cell discontinuous transmission operation comprises a request to stop or suspend cell discontinuous transmission operation to enable the user equipment to perform a data transmission associated with the data transmission need.

Example 4. The method according to any one of examples 1 to 3, further comprising, before the transmitting, determining by the user equipment to transmit and performing the transmitting in response to the determining to transmit.

Example 5. The method according to example 4, wherein the transmitting is performed in one transmission occasion of the common uplink channel, and the determining to transmit determines that a next transmission occasion of the common uplink channel should not be used to transmit, and the transmitting is not performed for the next transmission occasion.

Example 6. The method according to example 5, wherein a timer is used to prohibit transmissions in one or more further transmission occasions after a transmission occasion where the transmitting is performed on the common uplink channel.

Example 7. The method according to any of examples 1 to 6, wherein the transmitting the indication indicates urgency of the data transmission need.

Example 8. The method according to example 7, wherein one or more of the following are used to indicate different urgencies of the data transmission need: different random access channel codes for the common uplink channel, different preambles to be used on the common uplink channel, or different common uplink channel occasions.

Example 9. The method according to example 7, wherein transmit power ramping over multiple transmission occasions and corresponding multiple transmissions indicate transmission of data associated with the data transmission need is urgent.

Example 10. The method according to any one of examples 1 to 9, wherein the configuration for the common uplink channel indicates one or more of the following: when in time, where in common uplink channel occasions, or how to transmit one or more additional indications, the how to transmit indicating how to adjust power level of the one or more additional indications relative to a power level used in a previous transmission.

Example 11. The method according to any of examples 1 to 7, 9, or 10, wherein one or more of the following are used to indicate different power states of the user equipment: different random access channel codes for the common uplink channel, different preambles to be used on the common uplink channel, or different common uplink channel occasions.

Example 12. The method according to any one of examples 1 to 11, further comprising:
monitoring, after the transmission, by the user equipment for an acknowledgement by the base station that the indication was received;
determining by the user equipment that no acknowledgement was received;
performing one or more of the following in response to determination that no acknowledgement was received:
increasing transmit power for one or more future transmissions of the indication;
switching to a high urgency configuration that modifies the one or more future transmissions of the indication to indicate high urgency; or
preparing a transmission of the indication on a next common uplink channel occasion that is allowed by a timer, the timer being used to prohibit transmissions in one or more transmission occasions after a transmission occasion where the transmitting is performed for one transmission occasion of the common uplink channel.

Example 13. A method, comprising:
sending, by a base station in a wireless communication system, configuration for a common uplink channel to be used by user equipment to communicate with a base station concerning cell discontinuous transmission operation by the base station;
starting, by the base station, cell discontinuous transmission operation or signaling by the base station to the user equipment that cell discontinuous transmission operation will start;
receiving, by the base station from the user equipment over the common uplink channel, an indication of data transmission need concerning cell discontinuous transmission operation; and
determining, by the base station, whether to stay in or abandon the cell discontinuous transmission operation based at least partly on the received indication of data transmission need.

Example 14. The method according to example 13, wherein the receiving the indication indicates urgency of the data transmission need.

Example 15. The method according to example 14, wherein one or more of the following are used to indicate different urgencies of the data transmission need: different random access channel codes for the common uplink channel, different preambles to be used on the common uplink channel, or different common uplink channel occasions.

Example 16. The method according to example 14, wherein transmit power ramping over receptions of multiple transmission occasions indicate transmission of data associated with the data transmission need is urgent.

Example 17. The method according to example 14, wherein the configuration for the common uplink channel indicates one or more of the following for use by the user equipment: when in time, where in common uplink channel occasions, or how to transmit one or more additional indications, the how to transmit indicating how to adjust power level of the one or more additional indications relative to a power level used in a previous transmission.

Example 18. The method according to any of examples 13 to 17, wherein different power states of the user equipment are indicated using one or more of one or more of the following: different random access channel codes for the common uplink channel, different preambles to be used on the common uplink channel, or different common uplink channel occasions.

Example 19. The method according to any one of examples 13 to 18, wherein:
the method further comprises determining whether accumulated number of user equipment transmitting in the common uplink channel and receive power levels of those transmissions are greater than one or more thresholds; and
the determining whether to stay in or abandon the cell discontinuous transmission operation that has already been started or to start the cell discontinuous transmission operation that was signaled as starting makes determinations as follows:
to stay in the cell discontinuous transmission operation that has already been started or to start the cell discontinuous transmission operation that was signaled as starting in response to determining the accumulated number of user equipment transmitting in the common uplink channel and receive power levels of those transmissions are less than one or more thresholds; or
to abandon the cell discontinuous transmission operation that has already been started or not to start the cell discontinuous transmission operation that was signaled as starting in response to determining the accumulated number of user equipment transmitting in the common uplink channel and receive power levels of those transmissions are greater than one or more thresholds.

Example 20. The method according to any one of examples 13 to 19, wherein the determining is based on receiving indications of data transmission needs from multiple user equipment.

Example 21. The method according to any one of examples 1 to 20, wherein the common uplink channel is common because all user equipment connected to the base station are configured to use this uplink channel for communication of corresponding indications, when those indications will be communicated.

Example 22. A computer program, comprising instructions for performing the methods of any of examples 1 to 21, when the computer program is run on an apparatus.

Example 23. The computer program according to example 22, wherein the computer program is a computer program product comprising a computer-readable medium bearing instructions embodied therein for use with the apparatus.

Example 24. The computer program according to example 22, wherein the computer program is directly loadable into an internal memory of the apparatus.

Example 25. An apparatus, comprising means for performing:
receiving, by a user equipment in a wireless communication system, configuration for a common uplink channel to be used by the user equipment to communicate with a base station concerning cell discontinuous transmission operation by the base station;
determining, by the user equipment, that a cell discontinuous transmission operation has already started or the base station has signaled that cell discontinuous transmission operation will start; and
transmitting, by the user equipment over the common uplink channel, an indication of data transmission need concerning cell discontinuous transmission operation.

Example 26. The apparatus according to example 25, wherein the configuration for the common uplink channel comprises one or more of the following: one or more resource allocations for the common uplink channel, or one or more preambles to be used when transmitting on the common uplink channel.

Example 27. The apparatus according to any one of examples 25 or 26, wherein the indication of data transmission need concerning cell discontinuous transmission operation comprises a request to stop or suspend cell discontinuous transmission operation to enable the user equipment to perform a data transmission associated with the data transmission need.

Example 28. The apparatus according to any one of examples 25 to 27, wherein the means are further configured for performing: before the transmitting, determining by the user equipment to transmit and performing the transmitting in response to the determining to transmit.

Example 29. The apparatus according to example 28, wherein the transmitting is performed in one transmission occasion of the common uplink channel, and the determining to transmit determines that a next transmission occasion of the common uplink channel should not be used to transmit, and the transmitting is not performed for the next transmission occasion.

Example 30. The apparatus according to example 29, wherein a timer is used to prohibit transmissions in one or more further transmission occasions after a transmission occasion where the transmitting is performed on the common uplink channel.

Example 31. The apparatus according to any of examples 25 to 30, wherein the transmitting the indication indicates urgency of the data transmission need.

Example 32. The apparatus according to example 31, wherein one or more of the following are used to indicate different urgencies of the data transmission need: different random access channel codes for the common uplink channel, different preambles to be used on the common uplink channel, or different common uplink channel occasions.

Example 33. The apparatus according to example 31, wherein transmit power ramping over multiple transmission occasions and corresponding multiple transmissions indicate transmission of data associated with the data transmission need is urgent.

Example 34. The apparatus according to any one of examples 25 to 33, wherein the configuration for the common uplink channel indicates one or more of the following: when in time, where in common uplink channel occasions, or how to transmit one or more additional indications, the how to transmit indicating how to adjust power level of the one or more additional indications relative to a power level used in a previous transmission.

Example 35. The apparatus according to any of examples 25 to 31, 33, or 34, wherein one or more of the following are used to indicate different power states of the user equipment: different random access channel codes for the common uplink channel, different preambles to be used on the common uplink channel, or different common uplink channel occasions.

Example 36. The apparatus according to any one of examples 25 to 35, wherein the means are further configured for performing:
monitoring, after the transmission, by the user equipment for an acknowledgement by the base station that the indication was received;
determining by the user equipment that no acknowledgement was received;
performing one or more of the following in response to determination that no acknowledgement was received:

increasing transmit power for one or more future transmissions of the indication;

switching to a high urgency configuration that modifies the one or more future transmissions of the indication to indicate high urgency; or preparing a transmission of the indication on a next common uplink channel occasion that is allowed by a timer, the timer being used to prohibit transmissions in one or more transmission occasions after a transmission occasion where the transmitting is performed for one transmission occasion of the common uplink channel.

Example 37. An apparatus, comprising means for performing:

sending, by a base station in a wireless communication system, configuration for a common uplink channel to be used by user equipment to communicate with a base station concerning cell discontinuous transmission operation by the base station;

starting, by the base station, cell discontinuous transmission operation or signaling by the base station to the user equipment that cell discontinuous transmission operation will start;

receiving, by the base station from the user equipment over the common uplink channel, an indication of data transmission need concerning cell discontinuous transmission operation; and determining, by the base station, whether to stay in or abandon the cell discontinuous transmission operation based at least partly on the received indication of data transmission need.

Example 38. The apparatus according to example 37, wherein the receiving the indication indicates urgency of the data transmission need.

Example 39. The apparatus according to example 38, wherein one or more of the following are used to indicate different urgencies of the data transmission need: different random access channel codes for the common uplink channel, different preambles to be used on the common uplink channel, or different common uplink channel occasions.

Example 40. The apparatus according to example 38, wherein transmit power ramping over receptions of multiple transmission occasions indicate transmission of data associated with the data transmission need is urgent.

Example 41. The apparatus according to example 38, wherein the configuration for the common uplink channel indicates one or more of the following for use by the user equipment: when in time, where in common uplink channel occasions, or how to transmit one or more additional indications, the how to transmit indicating how to adjust power level of the one or more additional indications relative to a power level used in a previous transmission.

Example 42. The apparatus according to any of examples 37 to 41, wherein different power states of the user equipment are indicated using one or more of one or more of the following: different random access channel codes for the common uplink channel, different preambles to be used on the common uplink channel, or different common uplink channel occasions.

Example 43. The apparatus according to any one of examples 37 to 42, wherein:

the means are further configured for performing: determining whether accumulated number of user equipment transmitting in the common uplink channel and receive power levels of those transmissions are greater than one or more thresholds; and the determining whether to stay in or abandon the cell discontinuous transmission operation that has already been started or to start the cell discontinuous transmission operation that was signaled as starting makes determinations as follows:

to stay in the cell discontinuous transmission operation that has already been started or to start the cell discontinuous transmission operation that was signaled as starting in response to determining the accumulated number of user equipment transmitting in the common uplink channel and receive power levels of those transmissions are less than one or more thresholds; or to abandon the cell discontinuous transmission operation that has already been started or not to start the cell discontinuous transmission operation that was signaled as starting in response to determining the accumulated number of user equipment transmitting in the common uplink channel and receive power levels of those transmissions are greater than one or more thresholds.

Example 44. The apparatus according to any one of examples 37 to 43, wherein the determining is based on receiving indications of data transmission needs from multiple user equipment.

Example 45. The apparatus according to any one of examples 25 to 44, wherein the common uplink channel is common because all user equipment connected to the base station are configured to use this uplink channel for communication of corresponding indications, when those indications will be communicated.

Example 46. The apparatus of any preceding apparatus example, wherein the means comprises:

at least one processor; and at least one memory storing instructions that, when executed by at least one processor, cause the performance of the apparatus.

Example 47. An apparatus, comprising:

one or more processors; and one or more memories storing instructions that, when executed by the one or more processors, cause the apparatus at least to perform:

receiving, by a user equipment in a wireless communication system, configuration for a common uplink channel to be used by the user equipment to communicate with a base station concerning cell discontinuous transmission operation by the base station;

determining, by the user equipment, that a cell discontinuous transmission operation has already started or the base station has signaled that cell discontinuous transmission operation will start; and transmitting, by the user equipment over the common uplink channel, an indication of data transmission need concerning cell discontinuous transmission operation.

Example 48. The apparatus according to example 47, wherein the configuration for the common uplink channel comprises one or more of the following: one or more resource allocations for the common uplink channel, or one or more preambles to be used when transmitting on the common uplink channel.

Example 49. The apparatus according to any one of examples 47 or 48, wherein the indication of data transmission need concerning cell discontinuous transmission operation comprises a request to stop or suspend cell discontinuous transmission operation to enable the user equipment to perform a data transmission associated with the data transmission need.

Example 50. The apparatus according to any one of examples 47 to 49, wherein the one or more memories further store instructions that, when executed by the one or more processors, cause the apparatus at least to perform:

before the transmitting, determining by the user equipment to transmit and performing the transmitting in response to the determining to transmit.

Example 51. The apparatus according to example 50, wherein the transmitting is performed in one transmission occasion of the common uplink channel, and the determining to transmit determines that a next transmission occasion of the common uplink channel should not be used to transmit, and the transmitting is not performed for the next transmission occasion.

Example 52. The apparatus according to example 51, wherein a timer is used to prohibit transmissions in one or more further transmission occasions after a transmission occasion where the transmitting is performed on the common uplink channel.

Example 53. The apparatus according to any of examples 47 to 52, wherein the transmitting the indication indicates urgency of the data transmission need.

Example 54. The apparatus according to example 53, wherein one or more of the following are used to indicate different urgencies of the data transmission need: different random access channel codes for the common uplink channel, different preambles to be used on the common uplink channel, or different common uplink channel occasions.

Example 55. The apparatus according to example 53, wherein transmit power ramping over multiple transmission occasions and corresponding multiple transmissions indicate transmission of data associated with the data transmission need is urgent.

Example 56. The apparatus according to any one of examples 47 to 55, wherein the configuration for the common uplink channel indicates one or more of the following: when in time, where in common uplink channel occasions, or how to transmit one or more additional indications, the how to transmit indicating how to adjust power level of the one or more additional indications relative to a power level used in a previous transmission.

Example 57. The apparatus according to any of examples 47 to 53, 55, or 56, wherein one or more of the following are used to indicate different power states of the user equipment: different random access channel codes for the common uplink channel, different preambles to be used on the common uplink channel, or different common uplink channel occasions.

Example 58. The apparatus according to any one of examples 47 to 57, wherein the one or more memories further store instructions that, when executed by the one or more processors, cause the apparatus at least to perform:
  monitoring, after the transmission, by the user equipment for an acknowledgement by the base station that the indication was received;
  determining by the user equipment that no acknowledgement was received;
  performing one or more of the following in response to determination that no acknowledgement was received:
  increasing transmit power for one or more future transmissions of the indication;
  switching to a high urgency configuration that modifies the one or more future transmissions of the indication to indicate high urgency; or
  preparing a transmission of the indication on a next common uplink channel occasion that is allowed by a timer, the timer being used to prohibit transmissions in one or more transmission occasions after a transmission occasion where the transmitting is performed for one transmission occasion of the common uplink channel.

Example 59. An apparatus, comprising:
one or more processors; and
one or more memories storing instructions that, when executed by the one or more processors, cause the apparatus at least to perform:
sending, by a base station in a wireless communication system, configuration for a common uplink channel to be used by user equipment to communicate with a base station concerning cell discontinuous transmission operation by the base station;
starting, by the base station, cell discontinuous transmission operation or signaling by the base station to the user equipment that cell discontinuous transmission operation will start;
receiving, by the base station from the user equipment over the common uplink channel, an indication of data transmission need concerning cell discontinuous transmission operation; and
determining, by the base station, whether to stay in or abandon the cell discontinuous transmission operation based at least partly on the received indication of data transmission need.

Example 60. The apparatus according to example 59, wherein the receiving the indication indicates urgency of the data transmission need.

Example 61. The apparatus according to example 60, wherein one or more of the following are used to indicate different urgencies of the data transmission need: different random access channel codes for the common uplink channel, different preambles to be used on the common uplink channel, or different common uplink channel occasions.

Example 62. The apparatus according to example 60, wherein transmit power ramping over receptions of multiple transmission occasions indicate transmission of data associated with the data transmission need is urgent.

Example 63. The apparatus according to example 60, wherein the configuration for the common uplink channel indicates one or more of the following for use by the user equipment: when in time, where in common uplink channel occasions, or how to transmit one or more additional indications, the how to transmit indicating how to adjust power level of the one or more additional indications relative to a power level used in a previous transmission.

Example 64. The apparatus according to any of examples 59 to 63, wherein different power states of the user equipment are indicated using one or more of one or more of the following: different random access channel codes for the common uplink channel, different preambles to be used on the common uplink channel, or different common uplink channel occasions.

Example 65. The apparatus according to any one of examples 60 to 64, wherein:
  the one or more memories further store instructions that, when executed by the one or more processors, cause the apparatus at least to perform: determining whether accumulated number of user equipment transmitting in the common uplink channel and receive power levels of those transmissions are greater than one or more thresholds; and
  the determining whether to stay in or abandon the cell discontinuous transmission operation that has already been started or to start the cell discontinuous transmission operation that was signaled as starting makes determinations as follows:
  to stay in the cell discontinuous transmission operation that has already been started or to start the cell discontinuous transmission operation that was signaled as starting in response to determining the accumulated number of user equipment transmitting in the common uplink channel and receive power levels of those transmissions are less than one or more thresholds; or to abandon the cell discontinuous transmission operation that has already been started or not to start the cell discontinuous transmission operation that was signaled as starting in response to determining the accumulated number of user equipment transmitting in the common uplink channel and receive power levels of those transmissions are greater than one or more thresholds.

Example 66. The apparatus according to any one of examples 60 to 65, wherein the determining is based on receiving indications of data transmission needs from multiple user equipment.

Example 67. The apparatus according to any one of examples 47 to 66, wherein the common uplink channel is common because all user equipment connected to the base station are configured to use this uplink channel for communication of corresponding indications, when those indications will be communicated.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable): (i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1B. A computer-readable medium may comprise a computer-readable storage medium (e.g., memories 125 or other device) that may be any media or means that can contain, store, and/or transport the instructions for use by or in connection with an instruction execution system, apparatus, or device, such as a computer. A computer-readable storage medium does not comprise propagating signals, and therefore may be considered to be non-transitory. The term "non-transitory", as used herein, is a limitation of the medium itself (i.e., tangible, not a signal) as opposed to a limitation on data storage persistency (e.g., RAM, random access memory, versus ROM, read-only memory).

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:
 5G fifth generation
 ACK acknowledgment
 AMF access and mobility management function
 BBU base band unit
 BS base station
 CSM Cell sleep mode
 CU central unit
 DL downlink (from network to UE)
 DRX Discontinuous Reception
 DTX Discontinuous Transmission
 DU distributed unit
 eNB (or eNodeB) evolved Node B (e.g., an LTE base station)
 gNB (or gNodeB) base station for 5G/NR, Next generation node B
 ES Energy saving
 ID identification
 IE information element
 I/F interface
 LTE long term evolution
 MBMS Multimedia broadcast/multicast service
 MME mobility management entity
 NACK negative acknowledgement
 ng or NG next generation
 ng-eNB or NG-eNB next generation eNB
 NR new radio
 N/W or NW network
 PA power amplifier
 PDCCH Physical downlink control channel
 PDSCH Physical downlink shared channel
 PRB physical resource block
 QoE quality of experience
 QOS quality of service
 RA random access
 RACH random access channel
 RAN radio access network
 RAR random access response
 Rel release
 RLC radio link control
 RNTI Radio Network Temporary Identifier
 RRH remote radio head RRC radio resource control
RU radio unit
Rx receiver
SGW serving gateway
SIB System information broadcast
SMF session management function
SSB synchronization signal block
TR technical report
Tx transmitter
UE user equipment (e.g., a wireless, typically mobile device)
UI user interface
UPF user plane function
WID work item description

What is claimed is:

1. An apparatus, comprising:
one or more processors; and
one or more memories storing instructions that, when executed by the one or more processors, cause the apparatus at least to perform:
receiving a configuration for a common uplink channel to be used by the apparatus to communicate with a base station concerning cell discontinuous transmission operation by the base station;
determining, based on an indication from the base station, that a cell discontinuous transmission operation has already started or that cell discontinuous transmission operation will start; and
in response to the determining, transmitting, over the common uplink channel, an indication of data transmission need concerning cell discontinuous transmission operation based on a determination that the transmitting is allowed according to the configuration, wherein the indication of data transmission need indicates a request to stop or suspend cell discontinuous transmission operation to enable the apparatus to perform a data transmission associated with the data transmission need.

2. The apparatus according to claim 1, wherein the configuration for the common uplink channel comprises one or more of the following: one or more resource allocations for the common uplink channel, or one or more preambles to be used when transmitting on the common uplink channel.

3. The apparatus according to claim 1, wherein the one or more memories store instructions that, when executed by the one or more processors, further cause the apparatus at least to perform: before the transmitting, determining to transmit and performing the transmitting in response to the determining to transmit, wherein the determining to transmit comprises performing the determination that the transmitting is allowed according to the configuration.

4. The apparatus according to claim 3, wherein the transmitting is performed in one transmission occasion of the common uplink channel, and the determining to transmit determines that a next transmission occasion of the common uplink channel should not be used to transmit, and the transmitting is not performed for the next transmission occasion.

5. The apparatus according to claim 4, wherein a timer is used to prohibit transmissions in one or more further transmission occasions after a transmission occasion where the transmitting is performed on the common uplink channel.

6. The apparatus according to claim 1, wherein the transmitting the indication of data transmission need indicates urgency of the data transmission need.

7. The apparatus according to claim 6, wherein one or more of the following are used to indicate different urgencies of the data transmission need: different random access channel codes for the common uplink channel, different preambles to be used on the common uplink channel, or different common uplink channel occasions.

8. The apparatus according to claim 6, wherein transmit power ramping over multiple transmission occasions and corresponding multiple transmissions indicate transmission of data associated with the data transmission need is urgent.

9. The apparatus according to claim 1, wherein the configuration for the common uplink channel indicates one or more of the following: when in time, where in common uplink channel occasions, or how to transmit one or more additional indications, the how to transmit indicating how to adjust power level of the one or more additional indications relative to a power level used in a previous transmission.

10. The apparatus according to claim 1, wherein one or more of the following are used to indicate different power states of the user equipment: different random access channel codes for the common uplink channel, different preambles to be used on the common uplink channel, or different common uplink channel occasions.

11. The apparatus according to claim 1, wherein the one or more memories store instructions that, when executed by the one or more processors, further cause the apparatus at least to perform:
monitoring, after the transmission, an acknowledgement by the base station that the indication of data transmission need was received;
determining that no acknowledgement was received;
performing one or more of the following in response to determination that no acknowledgement was received:
increasing transmit power for one or more future transmissions of the indication of data transmission need;
switching to a high urgency configuration that modifies the one or more future transmissions of the indication of data transmission need to indicate high urgency; or
preparing a transmission of the indication of data transmission need on a next common uplink channel occasion that is allowed by a timer, the timer being used to prohibit transmissions in one or more transmission occasions after a transmission occasion where the transmitting is performed for one transmission occasion of the common uplink channel.

12. A method, comprising:
receiving a configuration for a common uplink channel to be used by an apparatus to communicate with a base station concerning cell discontinuous transmission operation by the base station;
determining, based on an indication from the base station, that a cell discontinuous transmission operation has already started or that cell discontinuous transmission operation will start; and
in response to the determining, transmitting, over the common uplink channel, an indication of data transmission need concerning cell discontinuous transmission operation based on a determination that the transmitting is allowed according to the configuration, wherein the indication of data transmission need indicates a request to stop or suspend cell discontinuous transmission operation to enable the apparatus to perform a data transmission associated with the data transmission need.

13. The method of claim 12, wherein the configuration for the common uplink channel comprises one or more of the following: one or more resource allocations for the common uplink channel, or one or more preambles to be used when transmitting on the common uplink channel.

14. The method of claim 12, further comprising, before the transmitting, determining to transmit and performing the transmitting in response to the determining to transmit, wherein the determining to transmit comprises performing the determination that the transmitting is allowed according to the configuration.

15. The method of claim 14, wherein the transmitting is performed in one transmission occasion of the common uplink channel, and the determining to transmit determines that a next transmission occasion of the common uplink channel should not be used to transmit, and the transmitting is not performed for the next transmission occasion.

16. The method of claim 15, wherein a timer is used to prohibit transmissions in one or more further transmission occasions after a transmission occasion where the transmitting is performed on the common uplink channel.

17. The method of claim 12, wherein the transmitting the indication of data transmission need indicates urgency of the data transmission need.

18. A non-transitory computer-readable medium comprising instructions stored thereon that, when executed on an apparatus, cause the apparatus to perform:
- receiving a configuration for a common uplink channel to be used by the apparatus to communicate with a base station concerning cell discontinuous transmission operation by the base station;
- determining, based on an indication from the base station, that a cell discontinuous transmission operation has already started or that cell discontinuous transmission operation will start; and
- in response to the determining, transmitting, over the common uplink channel, an indication of data transmission need concerning cell discontinuous transmission operation based on a determination that the transmitting is allowed according to the configuration, wherein the indication of data transmission need indicates a request to stop or suspend cell discontinuous transmission operation to enable the apparatus to perform a data transmission associated with the data transmission need.

\* \* \* \* \*